Figure 1:
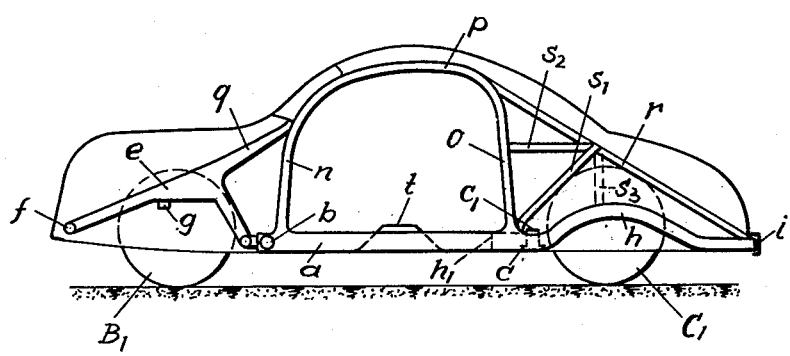

Feb. 9, 1954  J. MÜLLER  2,668,722
FRAME FOR MOTOR VEHICLES
Filed Nov. 23, 1949

INVENTOR
JOSEF MULLER
BY Haseltine, Lake + Co.
AGENTS

Patented Feb. 9, 1954

2,668,722

UNITED STATES PATENT OFFICE 2,668,722

FRAME FOR MOTOR VEHICLES

Josef Müller, Stuttgart, Germany, assignor to Daimler-Benz Aktiengesellschaft, Stuttgart-Unterturkheim, Germany Application November 23, 1949, Serial No. 128,939

Claims priority, application Germany November 30, 1948

6 Claims. (Cl. 280—106)

This invention relates to a frame for motor vehicles.

An object of the invention is the provision of particularly favorable spatial conditions with high strength and rigidity of the frame.

A special object of the invention is to provide a frame which while being very suitable for taking up the forces acting upon or developed in the vehicle, is adapted in an advantageous manner to the outer configuration of the vehicle or of its body.

Another object of the invention is to provide a frame which is easy to make and does not require any complicated methods and devices for its manufacture.

With these objects in view, one feature of the present invention consists substantially in that the frame comprises a wider middle part and two narrower end parts, which, for example, are connected to two cross bearers or members defining the forward and rearward ends of the middle part, and whose longitudinal members, if any, are reduced to a width which is smaller than that of the longitudinal members or bearers of the middle part of the frame. More particularly, the end parts of the frame are dimensioned so that the longitudinal frame members of the forward end part extending between the front wheels are spaced apart a lesser distance than the longitudinal members of the rear end part extending between the rear wheels which are staggered only a small amount relatively to the longitudinal members of the middle part.

This construction of the frame renders it possible to adapt the frame as much as possible to the outer shape of the car body, while providing the necessary wells for the wheels, i. e. to utilize fully the space available for the frame, and simultaneously to transmit to the middle part of the frame in a most appropriate manner the forces originating from the end parts of the frame, more particularly from the axles of the vehicle and from the driving aggregate. The middle part in this case preferably has a width corresponding to that of the car body, the longitudinal members of this middle part being arranged approximately at a mutual distance corresponding to the wheel gauge and laterally delimiting the inner space of the vehicle at the sides. The longitudinal members of the end parts of the frame, on the contrary, are appropriately spaced from each other by such a distance, or are staggered inwardly by such an amount with respect to the longitudinal members of the middle part of the frame as to define wheel wells wide enough to permit the steering obliquity of the steering wheels (which as a rule are formed by the front wheels only) or the use of non-steerable wheels (which as a rule are the rear wheels).

Owing to the fact that the forces occurring at the end parts of the frame are taken up by the cross members at the front and rear ends of the middle part of the frame, it is possible, moreover, to take up the main stresses of the frame by the two lateral longitudinal bearers or members and the said two cross members; in this case the frame structure consisting of the longitudinal and cross bearers can be made so rigid and stiff that additional longitudinal bearers traversing the middle part can be dispensed with. Therefore, the longitudinal members of the end parts of the frame can terminate at the cross members of the middle part of the frame.

The frame may be designed as an independent or self-contained frame bearing the body which has been manufactured independently thereof, or it may constitute, according to a preferred embodiment of the invention, a part of a self-supporting car body. Especially in the latter case no further direct braces or stiffenings of the middle part of the frame are required, but it is also possible, if desired, especially in case the car or vehicle is designed in the form of a convertible or soft-top cabriolet or the like, to stiffen the longitudinal members of the middle part of the frame relatively to each other, for example, by an additional middle cross bearer or the like; in this case, this cross bearer is appropriately connected with the longitudinal bearers of the middle part of the frame by means of an enlarged surface or an enlarged welding seam, which may extend over the whole length of the longitudinal members of the middle part of the frame.

The present invention moreover relates to a particularly suitable connection of the narrower end parts of the frame to the wider middle part thereof, or of the longitudinal members of the end parts of the frame to the longitudinal members or cross bearers of the middle part of the frame.

Referring to that end part of the frame which is reduced to a particularly narrow width (preferably the front part) the invention provides inter alia a cross bearer of the middle part which extends obliquely or is curved in a direction towards the end of the vehicle from the longitudinal members of this middle part to the longitudinal members of the end part of the frame.

Thus, the advantage is obtained that in spite of a sufficient play for the steering wheels the cross bearer of the frame in its middle part is placed forwardly as much as possible, whereby, especially if the cross bearer is arranged in the region of the front dash board, an unobstructed foot space is provided for the driver which extends as far as possible in a forward direction. This fact also contributes to the spaciousness of the interior of the vehicle combined with a relatively short overall length of the vehicle. Simultaneously, by the slanting direction of the ends of the cross bearer a more favorable transmission of the forces from the end part of the frame to the middle part thereof is attained. This effect is enhanced by the fact that the cross bearer forms an obtuse angle with the longitudinal members of the middle part of the frame and is connected to these longitudinal members which, for example, are penetrated by the cross bearer, so as to form an oblique welding seam.

On the other hand, according to a preferred form of the present invention that end part of the frame (more particularly the rear end part) which is inwardly staggered only a relatively small amount in relation to the middle part of the frame, is connected to the middle part of the frame in such a way that the outer wall of each of the longitudinal members of the end part of the frame is attached to the inner wall of the respective longitudinal member of the middle part of the frame and welded thereto. In this case the ends of the two longitudinal members engaging each other and being welded together, for reducing the weight and for attaining a more uniform transition, may be tapered wedge-fashion or in a similar manner. It is also contemplated, if desired, to make the longitudinal members of the middle part of the frame and of the end part of the frame, which are relatively staggered approximately by the width of the member, from a single member which is cranked at the transition point. Moreover, a connection which is particularly favorable for taking up the mechanical forces can be obtained by stiffening or bracing the relatively staggered longitudinal members of the two frame parts, which are preferably welded together, at the transition or welding point by means of a cross bearer overlapping or traversing both of the longitudinal members and welded thereto. Instead of a direct connection of the longitudinal members of the end part with the longitudinal members of the middle part it is also contemplated, however, to provide in this case a connection of the two longitudinal members through the cross bearer alone, especially where a larger staggering of the longitudinal members in a transverse direction is required, either because the longitudinal members of the middle part of the frame are arranged still farther outwards (for example also outside the track gauge of the wheels), or because the longitudinal members of the end part of the frame (for example on account of the provision of steerable rear wheels) are arranged at a smaller distance.

Other and further objects, features and advantages of the invention will be pointed out hereinafter and appear in the appended claims forming part of the application.

In the accompanying drawings a now preferred embodiment of the invention is shown by way of illustration and not by way of limitation.

Figure 2:
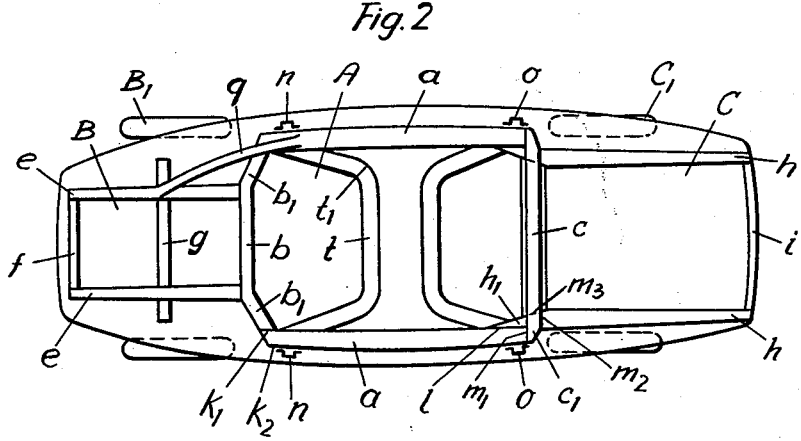

Figure 1 is a side view of a frame or car body having the invention applied thereto, and Figure 2 is a plan view thereof with one of the front struts omitted in order to show the connection between the front bearer and longitudinal girder.

Similar reference numerals denote similar parts in the two figures.

Referring now to the drawings in greater detail, it will be seen that the frame or chassis of the car body comprises a middle frame part A, a front end frame part B and a rear end frame part C. The middle frame part comprises two L-section longitudinal girders $a$, a front bearer $b$ and a rear bearer $c$ as well as an intermediate cross bearer $t$. The front end frame part B comprises moreover two longitudinal girders $e$ welded to the cross bearers $b$ and cranked, near the axle of the front wheels $B_1$, said two longitudinal girders $e$ being relatively stiffened by a front end cross bearer $f$ or an additional cross bearer $g$ which may serve for supporting the wheel spring system. The rear end frame part comprises two longitudinal girders $h$ interconnected at their ends by a cross bearer $i$.

As shown in the drawing, the longitudinal girders $e$ of the front end frame part are spaced apart a smaller distance than the frame girders $h$ of the rear end frame part which are arranged almost directly on the inner side of the rear wheels $C_1$ and are staggered in relation to the longitudinal girders $a$ of the middle frame part only by about the width of the bearer.

The end portion $b_1$ of the cross bearer $b$ extends in an oblique inward and forward direction from the longitudinal girders $a$ of the middle part towards the longitudinal girders $e$ of the forward end part, so that a sufficient well is left for the steering obliquity of the front wheels $B_1$ and simultaneously the foot space for the driver is not obstructed by the cross bearer. The cross bearer $b$ may have a tubular section, its ends being passed through the longitudinal girders $a$ which, for instance, are of a box-shaped cross section, and welded thereto at the inside $k_1$ or at the outside $k_2$ or at both sides of the longitudinal girders, by a welding seam directed obliquely to the cross bearers. Thus a larger welding joint is obtained which is particularly favorable for transmitting the forces.

The cross bearer $c$, as shown, may be of U-shaped cross section or it may also be formed as a hollow bearer, in a tubular or box shape. In order to connect the longitudinal rear frame girders $h$ with the middle frame part A, the girders $h$ are extended somewhat beyond the cross bearer $c$, the extension $h_1$ being bevelled in wedge form and leaning with an outer longitudinal joint $l$ against the inner wall of the longitudinal frame girder $a$. The two longitudinal frame girders $h$ and $a$ are welded together along this longitudinal joint $l$. The upper part $c_1$ of the cross bearer $c$ which projects over the longitudinal girders overlaps the two longitudinal girders and is advantageously welded to the longitudinal girders $a$ and $h$ on both sides at $m_1$ and $m_2$ and at its cut off front end $m_3$.

In the immediate vicinity of the four corners of the middle frame part, the posts $n$ and $o$ of a self-supporting car body are welded to the outside of the longitudinal girders $a$ of the middle frame part. They may simultaneously serve as door posts for the car body and may be combined to a bow-shaped or curved upper chord or head arch $p$. The posts and upper chords of the two sides of the vehicle may be mutually stiffened in any desired manner.

On the frame work thus formed, on the one hand, the upwardly cranked longitudinal girders $e$ of the front part of the frame are supported by struts $q$ and, on the other hand, the longitudinal girders $h$ of the rear end frame part are supported by struts $r$. Further struts $s_1$, $s_2$, $s_3$ may complete the stiffening of the rear part of the car.

The floor of the vehicle is advantageously welded to the longitudinal girders $a$ and the cross bearers $b$, $c$, $t$; in this case the bottom may simultaneously contribute to the formation of the profile of the bearers, and more particularly it may close the lower side of the U-shaped cross bearers $c$ and $t$. Advantageously the cross bearer $t$ serves to carry the front seats. Moreover the rear cross bearer $c$ may serve to take up further seats. Where this frame is used for example for convertible cabriolets or the like (i. e., for vehicles whose frames cannot be stiffened by an upper frame work of the car body), the middle or intermediate cross bearer may be designed as a particularly wide cross bearer $t$ in the manner as indicated in Fig. 2 of the drawing. This cross bearer is enlarged fanshaped towards its ends, in such a way that the flared portions $t_1$ lie against the longitudinal girders $a$ over the whole length thereof and are connected thereto by a welding seam extending over this length. The bearer $t$ may also extend to form a part of the floor sheet and if desired it may also have the profile of the longitudinal girders $a$ formed integrally therewith at the lateral edges.

The wheels of the vehicle may be mounted on the end parts B or C of the frame in any desired manner; e. g., the front wheels $B_1$ may be suspended therefrom by means of steering link quadrangles, the rear wheels by means of oscillating half axles, rigid axles or the like. The driving aggregate is advantageously supported as an integral unit in one of the end parts of the vehicle.

While the invention has been described in detail with respect to a now preferred example and embodiment of the invention, it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A frame for a motor vehicle comprising a wide middle part having lateral longitudinal girders substantially defining the width of the vehicle track, a substantially narrower front end part adapted to be flanked by the steerable wheels of the vehicle and having lateral longitudinal girders spaced inwardly of the girders of the middle part a distance sufficient to define on each side of the vehicle, relatively to the vehicle track, a wheel well wide enough to permit steering motion of the flanking wheels, a cross bearer connecting the girders of the middle part to each other and to the girders of the front part including side portions extending forwardly and inwardly from the girders of the middle part toward the girders of the front part and defining the rearward limits of the wheel wells, and a central portion substantially in register with the rear limit of the steerable wheels to define a forward limit for a foot-well for the driver spaced forwardly of the rearward limit of the wheel wells, and a rear end part slightly narrower than the middle part having lateral longitudinal girders spaced inwardly from the girders of the middle part a distance substantially equal to the thickness thereof and sufficient to define on each side of the vehicle, relatively to the vehicle track, a wheel well wide enough to accommodate non-steerable wheels flanking the rear end part.

2. A frame for a motor vehicle comprising a wide middle part having lateral longitudinal girders substantially defining the width of the vehicle track, a substantially narrower front end part adapted to be flanked by the steerable wheels of the vehicle and having lateral longitudinal girders spaced inwardly of the girders of the middle part a distance sufficient to define on each side of the vehicle, relatively to the vehicle track, a wheel well wide enough to permit steering motion of the flanking wheels, a front cross bearer connecting the girders of the middle part to each other, and to the girders of the front part, and a rear end part slightly narrower than the middle lateral part having lateral longitudinal girders overlapping the girders of the middle part over a small longitudinal distance and having their outer faces welded to the inner faces of the girders of the middle part, a rear cross bearer of polygonal cross-section welded to the girders of the middle and rear parts at their mutual overlapping zone, the front bearer including side portions defining the rearward limits of the wheel wells and extending forwardly and inwardly from the rearward limit of the wheel wells to a point substantially in register with the rear limit of the steerable wheels and a central portion connecting the forward ends of the side portions, and the rear bearer extending in a substantially straight line.

3. A frame as in claim 2 comprising a further stiffening cross bearer extending between the girders of the middle part intermediate the front and rear bearers and including fan-shaped ends welded to the girders of the middle part substantially from end to end thereof.

4. A frame as in claim 1 comprising a further stiffening cross bearer extending from side to side of the middle part and including fan-shaped ends welded to the girders of the middle part substantially from end to end thereof.

5. A frame as in claim 1 wherein the bearer extends through and is welded to the girders of the middle part.

6. A frame as in claim 2 wherein the girders of the middle part and the rear cross bearer comprise portions of downwardly open cross-section, and further comprising a floor member extending throughout the space defined by the bearers and the middle part and welded to the bottom thereof thereby to close said portions of open cross-section.

JOSEF MÜLLER.

References Cited in the file of this patent

UNITED STATES PATENTS

| Number | Name | Date |
|---|---|---|
| 2,108,215 | Stief et al. | Feb. 15, 1938 |
| 2,174,922 | Kuiper | Oct. 3, 1939 |
| 2,366,698 | Cole | Jan. 9, 1945 |
| 2,383,029 | Ulrich | Aug. 21, 1945 |
| 2,551,528 | Darrin | May 1, 1951 |

FOREIGN PATENTS

| Number | Country | Date |
|---|---|---|
| 612,287 | Great Britain | Nov. 10, 1948 |
| 856,717 | France | Mar. 23, 1940 |